Feb. 16, 1965 J. A. WEBB, SR 3,170,063
HIGH SPEED BINARY ADDER AND/OR SUBTRACTOR CIRCUIT
Filed Dec. 14, 1960
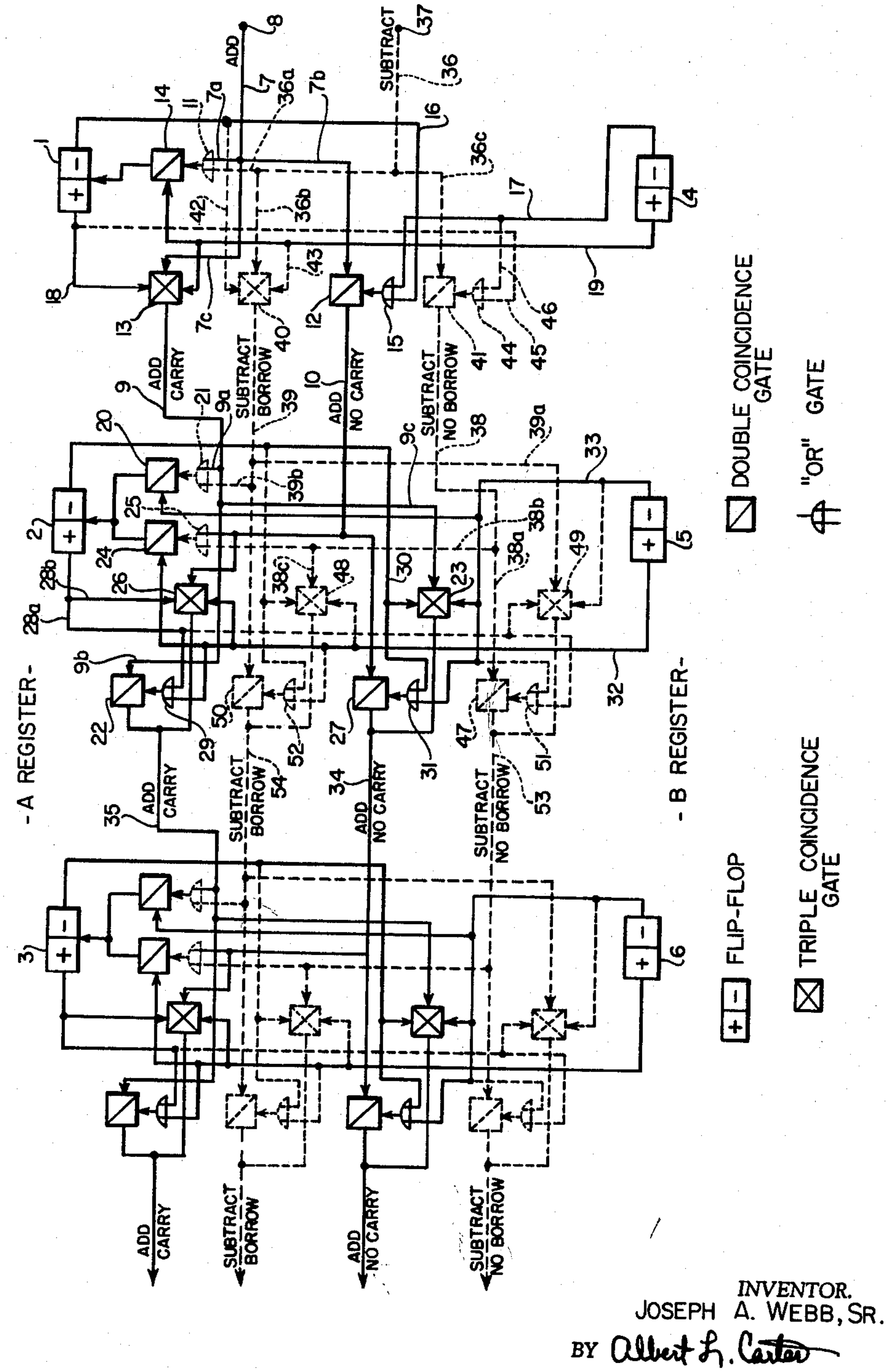
INVENTOR.
JOSEPH A. WEBB, SR.
BY Albert L. Carter
Attorney United States Patent Office 3,170,063

Patented Feb. 16, 1965

3,170,063
HIGH SPEED BINARY ADDER AND/OR SUBTRACTOR CIRCUIT

Joseph A. Webb, Sr., Atlanta, Ga.
(735 Rasada St., Satellite Beach, Fla.)

Filed Dec. 14, 1960, Ser. No. 75,801
12 Claims. (Cl. 235—175)

This invention concerns a high speed binary digital adder and/or subtractor circuit, and more particularly to a binary digital adder and/or subtractor circuit wherein an add or subtract signal of pulse logic is transmitted to each stage of a multiple stage pair of augend and addend registers substantially simultaneously as in parallel addition, the add or subtrace pulse logic signal simultaneously indicating any binary "carry" or "borrow" to the next subsequent stage with the add or subtract signal.

The principles of binary arithmetic provide that each digit or stage of a multi-bit binary number will consist of one of any two different or distinguishing indicia or signals, such as a 1 or 0, or a + or —. Likewise, in each stage of a binary number one of the indicia or signals will indicate the presence of the decimal number 2 raised to the power represented by that stage in the decimal number represented by the binary number, and the other or opposite indicia or signal will represent the lack of the decimal number 2 raised to the power represented by that stage in the decimal number represented by the binary number. For example, in a five digit or five stage binary number, the stage at the right hand represents the decimal number $2^0$, or 2 to the zero power; the second stage to the left represents $2^1$, or 2 to the first power; the next or third stage to the left represents $2^2$, or 2 to the second power; and so on to where the last stage to the left of a five stage binary number represents $2^4$, or 2 to the fourth power. As an example the binary number 11101 equals the decimal number 29 (where 1 indicates a plus or presence and 0 indicates a negative or lack). The breakdown is:

| | $2^4$ | $2^3$ | $2^2$ | $2^1$ | $2^0$ | | |
|---|---|---|---|---|---|---|---|
| Binary | 1 | 1 | 1 | 0 | 1 | = | 29 |
| Decimal | 16 | 8 | 4 | 0 | 1 | = | 29 |

In binary addition units are "carried" as in addition of decimal numbers and the addition of two binary digits of the same stage or power follows one of the six following rules:

(1) A 0 and a 0, without a "carry" from the previous stage equals a 0 without a "carry" to the subsequent stage.

(2) A 0 and a 0, with a "carry" from the previous stage equals a 1 without a "carry" to the subsequent stage.

(3) A 1 and a 0, without a "carry" from the previous stage equals a 1 without a "carry" to the subsequent stage.

(4) A 1 and a 0, with a "carry" from the previous stage equals a 0 with a "carry" to the subsequent stage.

(5) A 1 and a 1, without a "carry" from the pevious stage equals a 0 with a "carry" to the subsequent stage.

(6) A 1 and a 1, with a "carry" from the previous stage equals a 1 with a "carry" to the subsequent stage.

Likewise, in binary subtraction, units are "borrowed" as in subtraction of decimal numbers and the subtraction of one binary digit from another of the same stage or power follows one of the following eight rules:

(1) A 0 from a 0, without a "borrow" from the previous stage equals a 0 without a "borrow" from the subsequent stage.

(2) A 0 from a 0, with a "borrow" from the previous stage equals a 1 with a "borrow" from the subsequent stage.

(3) A 0 from a 1, without a "borrow" from the previous stage equals a 1 without a "borrow" from the subsequent stage.

(4) A 0 from a 1, with a "borrow" from the previous stage equals a 0 without a "borrow" from the subsequent stage.

(5) A 1 from a 0, without a "borrow" from the previous stage equals a 1 with a "borrow" from the subsequent stage.

(6) A 1 from a 0, with a "borrow" from the previous stage equals a 0 with a "borrow" from the subsequent stage.

(7) A 1 from a 1, without a "borrow" from the previous stage equals a 0 without a "borrow" from the subsequent stage.

(8) A 1 from a 1, with a "borrow" from the previous stage equals a 1 with a "borrow" from the subsequent stage.

Binary adders in general comprise a pair of flip-flop or bistable devices for each binary stage or digit wherein such flip-flops will indicate a high voltage electrical signal from one of two tubes while the other tube is in a conducting state. The flip-flop may be made to change state to put the previously nonconducting tube into a conducting state, and the previously conducting tube into a non-conducting state by means of a pulse or signal going to both tubes at once. The flip-flop of the depicted embodiment of this invention operates such that when one tube of the flip-flop representing stage $n$ of a binary number is nonconducting to indicate a 1, the decimal number $2^{n-1}$ is present in the decimal number represented by the composite binary number. Likewise when the other tube of the same flip-flop is nonconducting, a 0 is indicated to show the lack of the decimal number $2^{n-1}$ in the decimal number represented by the composite binary number.

For ease of discussion, one set of flip-flops in the binary adder will be referred to as the A register and the other set of flip-flops referred to as the B register. Usually, the A register is utilized to contain the augend and the B register the addend (in the case of addition), and with an appropriate circuitry interconnecting the A and B registers, whereupon the introduction of an appropriate signal changes the A register to represent the sum of the augend (previous number in A register) and the addend or number in the B register. In the cases of subtraction, multiplication and division respectively, the A register will contain the minuend and product, product, and dividend, while the B register will contain the subtrahend, multiplicand or multiplier, and divisor.

Carrying out the individual add or subtract operations is accomplished by the introduction of an add signal into the adder circuitry which is arranged to introduce signals to both tubes of the appropriate A register stages for changing their conducting states, if need be, to indicate the new binary number as a result of the computation. The prior art provided various arrangements for the appropriate "carries" and "borrows" by devices including: means for conducting appropriate carry signals separate from the add or subtract command signal; means for determining which A register flip-flops shall be changed upon introduction of a command signal, such determination being ahead of the time a command signal is introduced, then bypassing those stages of no change completely by a parallel type circuitry; and, means for serially carrying the command signal through each individual stage with a delay device activated when an A register flip-flop has to change its conducting state. While each of these different arrangements have a feature that is desirable, such feature is obtained by a compromise through the introduction of undesirable features. In the case of separate "carry" signals there is required an additional signal source and associated circuitry over and above the command signal, which adds complexity as well as a time delay in obtaining the answer to a computation. In the by-pass of "carry" signals, which are predetermined prior to a command signal, there is a time delay built in due to the work that must be performed prior to the command signal as well as the introduction of complexity and substantial additional circuitry and components. With the possibility of a delay device being activated at each stage in serially carrying the command signal through each stage a most substantial time delay is encountered at each stage that a "carry" or "borrow" is generated. Such undesirable features have been found to be eliminated with an exceptional increase in speed of computation operations through use of this invention.

Accordingly, it is an object of this invention to provide a binary adder and/or subtractor device of exceptionally high speed.

It is a further object of this invention to provide a binary adder and/or subtractor device of high speed utilizing pulse logic with a command pulse signal transfer through each stage sequentially.

Another object of this invention is to provide a high speed binary adder and/or subtractor device wherein the slowest speed elements have to operate no more than once.

Still a further object of this invention is to provide a high speed binary adder and/or subtractor device wherein all the low speed elements work at substantially the same time rather than all at once or all sequentially, such low speed element operation not affecting the progress of the computation command signal in any preceding or subsequent stage.

It is still another object of this invention to provide a high speed binary adder and/or subtractor device utilizing a maze of gates at each stage arranged in a logical manner whereby a command signal can only go through one gate per stage.

A further object of this invention is to provide a high speed binary adder and/or subtractor device using semi-conductor diode gates wherein "carries" or "borrows" (as the case may be) are taken care of by a specific routing of the add or subtract command signal through specific gates.

It is still a further object of this invention to provide a high speed binary adder and/or subtractor device capable of allowing N repetitive binary operations in less time than NT, where T is the total time for one operation.

A still further object of this invention is to provide a high speed binary adder and/or subtractor device wherein the high speed is obtained by performing logical operations in diode gates in each stage without having to wait for bistable or flip-flop elements in each stage to make or start necessary changes in state before the operation proceeds or continues to subsequent stages.

Other objects and advantages will become apparent from the following description taken in connection with the accompanying drawing showing a block diagram of one embodiment of this invention, of a plurality of stages in a binary adder and/or subtractor, the portion shown in full lines comprising the adder circuitry and the portion shown in dash lines the subtractor circuitry.

Generally stated, the invention comprises a pair of bistable flip-flop devices for each stage of a multi-stage binary number, each flip-flop of a pair being interconnected with each other and each stage interconnected to each of its preceding and subsequent stage by a plurality of semi-conductor diode gates in such a manner that a command pulse or signal from a preceding stage will enter on one of a plurality of conductors and will pass on to a subsequent stage on one of another plurality of conductors, which of the conductors the signals enter being determined by the condition of the flip-flops in the preceding stage and the type of signal the preceding stage received, and which of the conductors the signals leave a stage to the succeeding stage being determined by the condition of the flip-flops in the stage the signal is leaving and the type of signal that came into that stage. The arrangement of the conductors and gates is such that the command signal passes through each stage without concern of whether the flip-flop of that stage has to change, has changed, or is changing. Accordingly, once a command signal is started through the gates, and a delay of the time for the signal to pass through one gate and the time for one flip-flop to change has passed, a second repetitive command signal may be started even though the total operation time for the first command signal has not elapsed.

As an example, the total time delay $T_1$ required to perform a complete addition or subtraction using this invention may be expressed as:

$$T_1 = NT_g + T_{ff} \qquad (1)$$

where $N$=number of stages in the computation;
$T_g$=time delay in each gate; and
$T_{ff}$=time delay in one flip-flop.

Likewise, the minimum time delay $T_2$ between any two add or subtract pulses to avoid interference between them can be expressed as:

$$T_2 = T_g + T_{ff} \qquad (2)$$

In one embodiment of this invention, with a gating delay of 0.016 microseconds and flip-flop operation time of 0.1 microseconds, the total time required to perform a complete operation in 36 stages from Equation 1 would be:

$$T_1 = 36 \times 0.016 + 0.1 = 0.676 \text{ microseconds}$$

The minimum time delay between successive command signals or pulses from Equation 2 would be:

$$T_2 = 0.1 + 0.016 = 0.116 \text{ microseconds}$$

Thus, it can be seen that in the example of 36 stages used, some five individual add or subtract pulses can be operating through the computer at the same time without any interference between the pulse signals.

Referring more specifically to the drawing, there are shown three stages of circuitry in block diagram form of one embodiment of this invention, it being understood that any number of stages may be added, each of which would be identical to that shown for the second and third stages. Each stage contains a bistable device or flip-flop in both the A register and B register, those in the A register being identified by the numerals 1, 2 and 3 respectively for the first, second and third stages, and those in the B register by the numerals 4, 5 and 6 respectively for the first, second and third stages. Flip-flop circuits, of the type which are utilized in the invention as flip-flops 1 through 6, are commonly known in the art, and form no part of the subject invention per se. Such flip-flop circuits normally consist of two tubes connected through a conductor (not shown) to a source of electrical energy (also not shown). One tube of the pair is always in a conducting state and the other tube in a cutoff state whereby one tube reads a high or positive voltage while the other tube reads a low or no voltage. When the tube at the left reads a high voltage, the flip-flop is normally said to read a binary plus or 1. When the tube at the right reads a high voltage, the flip-flop is normally said to read a binary minus or 0. The flip-flop may be made to change state from a 1 to a 0, or vice versa, by means of a pulse leading to both tubes. This pulse connection is normally shown to go in the center of the flip-flop.

Between the pair of register A and register B flip-flops of each stage, and between each pair of adjacent stages are a maze or plurality of "OR" gates and "AND" gates. The "OR" and "AND" gates, of the type used in the invention, are also commonly known in the art, and form no part of the invention per se. Such "OR" gates are normally devices to provide an output if a voltage or pulse appears on either or any one of its two or more input lines. Thus an "OR" gate merely provides a means of isolation between its input lines.

As for the "AND" gates, which are also known as coincidence gates, there is an output voltage or pulse provided whenever all of the inputs are positive, whether the positive inputs be a function of D.C. levels or pulses. In other words, if a simple double coincidence gate provides a D.C. level of sufficient magnitude at one input and a pulse at the other input, then an output pulse will be provided by passage of the input pulse through the gate. For triple or greater coincidence gates, a sufficiently high D.C. voltage must appear on all D.C. inputs and a pulse must be presented to the pulse input. Thus coincidence or "AND" gates may be considered as electrical gating devices which will permit a pulse to pass therethrough so long as there is a D.C. voltage level of sufficient magnitude at all the D.C. inputs at the time the pulse arrives at the pulse input.

Referring back to the drawing, the first stage addition circuitry (which is shown in solid lines) contains flip-flop 1 in the A register and flip-flop 4 in the B register. When an add pulse is supplied to the adder by introduction to conductor 7 at point or terminal 8 by any appropriate means (not shown), the pulse will cause addition of the binary number in B register flip-flop 4 into a register flip-flop 1, and this add pulse, which may also be considered as a command signal, passes on to the second stage over one of the conductors 9 or 10. The pulse passage from the first to the second stage through conductor 9 supplies or carries a combined add pulse and a "carry," while a pulse passage through conductor 10 supplies or carries a "no carry" add pulse only; the determination of whether the add pulse passes through conductor 9 or 10 being controlled by the gating and the condition of flip-flops 1 and 4. The add pulse entering through conductor 7 passes to "OR" gate 11, double coincidence "AND" gate 12, and triple coincidence "AND" gate 13 simultaneously over conductor branches 7*a*, 7*b* and 7*c* respectively (it being understood that electrical connections between conductors and branches being indicated by dots and the mere crossing without a dot indicates no electrical connection). The pulse passing over conductor branch 7*a* is passed by "OR" gate 11 to double coincidence "AND" gate 14, it further being understood that without the subtractor circuitry being combined with the added circuitry, "OR" gate 11 would not be necessary. A D.C. voltage is supplied to "AND" gate 12 from an "OR" gate 15 if either or both of the flip-flops 1 and 4 supplies a high D.C. voltage from the right hand or minus tube to indicate a binary 0 therein, the D.C. voltage passing from flip-flops 1 and 4 to gate 15 through conductors 16 and 17 respectively. Likewise, a D.C. voltage is supplied to gate 13 from flip-flop 1 through conductor 18 if the left hand or positive tube in flip-flop 1 supplies a high voltage to indicate the presence of a binary 1 prior to any change in flip-flop 1 as the result of adding the binary number in flip-flop 4 into flip-flop 1. D.C. voltages from the left hand tube of flip-flop 4 are supplied to gates 13 and 14 through conductor 19 to indicate the presence of a binary 1 in flip-flop 4.

For an example of following an add pulse through the first adder stage to see how the various gates in combination with the D.C. voltages control the path of the pulse, reference is first made back to the general rules of binary addition set forth heretofore. By eliminating consideration of carries as there is no previous stage, the pulse passage to the second stage over conductor 9 can only occur when flip-flops 1 and 4 both contain a 1, and likewise, flip-flop 1 will only change its conducting state if flip-flop 4 indicates the presence of a binary 1. The combination of flip-flops 1 and 4 can be any one of the following four:

| Combination | Flip-flop 1 | Flip-flop 4 |
|---|---|---|
| 1 | 0 | 0 |
| 2 | 1 | 0 |
| 3 | 0 | 1 |
| 4 | 1 | 1 |

In the case of combination 1, an add pulse through conductor branches 7*a*, 7*b* and 7*c* simultaneously can pass through gate 12 due to the presence of a D.C. voltage over either conductor 16 or 17 and hence will pass through conductor 10 to the second stage. The pulse cannot pass through gate 13 because of the lack of a D.C. voltage over both conductors 18 and 19, and likewise cannot pass through gate 14 to change the conducting state of flip-flop 1 due to the lack of a D.C. voltage over conductor 19, which would indicate a binary 1 in flip-flop 4 to be added to flip-flop 1, and hence change the conducting state thereof. So the result of combination 1 is to pass the add pulse to the second stage over conductor 10 (and thus indicating a "no carry"), and leaving the conducting state of flip-flop 1 the same as there is a 0 in flip-flop 4. The result in the case of combination 2 is the same with the exceptions that the add pulse cannot pass through gate 13 because of the lack of a D.C. voltage through conductor 19 only, and a D.C. voltage is supplied to "OR" gate 15 through conductor 17 only.

Combination 3 produces the result of the add pulse passing through conductors 7, 7*b*, gate 12 and conductor 10, the pulse being passed by gate 12 by virtue of a D.C. voltage thereto from flip-flop 1 through conductor 16 and "OR" gate 15. The pulse cannot pass through gate 13 due to a lack of D.C. voltage through conductor 18, while the pulse can pass through gate 14 because of the presence of a D.C. voltage through conductor 19, thereby indicating a binary 1 in flip-flop 4. This passage of the pulse through gate 14 lets it pass to both tubes of flip flop 1 causing the two tubes to reverse their conducting state so as to change flip-flop 1 to indicate a 1, it being realized and understood that because of the comparative delay times of the various gates and the flip-flops, the prevention or passage of the add pulse through gate 13 is accomplished prior to the completion of the change of conducting states of the two tubes of the flip-flop, and thus any reversal of a D.C. voltage from conductor 18 to 16, or vice-versa, occurs at a sufficient time after the passage of the pulse to avoid any effect thereon.

In combination 4, the add pulse will travel from point 8 where it is introduced into the circuitry to the second stage through conductors 7, 7*c*, gate 13, and conductor 9; the passage through gate 13 occurring because of the presence of a D.C. voltage from both conductors 18 and 19. The pulse cannot pass through gate 12 because of the lack of a D.C. voltage from either of conductors 16 or 17 to "OR" gate 15. The pulse will also pass through gate 14 due to the presence of a D.C. voltage delivered thereto through conductor 19, and thereby cause a change in the conducting states of both tubes in flip-flop 1 to change the indication from presence of a binary 1 to the presence of binary 0, all in accordance with the rules of binary addition set forth above.

Thus, it can be seen the add or command pulse introduced at point 8 will pass through the circuitry from the first stage to the second stage through one of two conductors, conductor 9 carrying the add pulse with the indication of a "carry," and conductor 10 carrying the add pulse with the indication of a "no carry" or lack of "carry" signal.

Referring now to the second stage, which consists of flip-flop 2 in the A register and flip-flop 5 in the B register, it is to be understood that the description and explanation is identical for the third stage as well as any subsequent stages utilized that follow the third stage. Likewise it is to be noted that the second and all subsequent stages are slightly different by the addition of one triple coincidence and two double coincidence gates over the circuitry of the first stage. This additional gating is required in that in all stages subsequent to the first the add pulse signal can enter on one of two conductors whereas in the first stage the add pulse signal can enter only on the single conductor 7.

In the second stage, an add pulse entering through conductor 9, which indicates a "carry," passes to double coincidence gate 20 over conductor branch *9a* and through "OR" gate 21, double coincidence gate 22 through conductor branch *9b* and triple coincidence gate 23 through conductor branch *9c*. If the add pulse enters through conductor 10, which indicates a "no carry," it passes to double coincidence gate 24 after passing through "OR" gate 25, to triple coincidence gate 26, and to double coincidence gate 27. A D.C. voltage from the + or binary 1 side of flip-flop 2 passes to gate 22 through conductor branch *28a* and "OR" gate 29, and to gate 26 through conductor branch *28b*. The D.C. voltage from the — or binary 0 side of flip-flop 2 passes through conductor 30 to gates 23 and 27, the passage to gate 27 also including passage through "OR" gate 31. As for flip-flop 5, the D.C. voltage from the + or binary 1 side passes through conductor 32 into gate 22 subsequent to passage through "OR" gate 29, and to gates 24 and 26 directly. Flip-flop 5 D.C. voltage from the — or binary 0 side passes through conductor 33 to gates 20 and 23 directly, and to gate 27 after passing through "OR" gate 31.

With the circuitry of the second stage as shown and described it is believed a better understanding of this portion of the invention can be achieved by considering each of the possible combinations of the conducting states of flip-flops 2 and 5 similar to the way they were considered for flip-flops 1 and 4 of the first stage. To do this for the second stage there are eight combinations to be checked, rather than the four in the first stage since in the second stage the add pulse can enter the circuitry on conductor 9 indicating a "carry" or on conductor 10 indicating a "no carry." Accordingly the eight combinations are:

| Combination | Flip-flop 2 | Flip-flop 5 | Pulse Conductor |
|---|---|---|---|
| 1 | 0 | 0 | 10 |
| 2 | 1 | 0 | 10 |
| 3 | 0 | 1 | 10 |
| 4 | 1 | 1 | 10 |
| 5 | 0 | 0 | 9 |
| 6 | 1 | 0 | 9 |
| 7 | 0 | 1 | 9 |
| 8 | 1 | 1 | 9 |

In the first combination the pulse entering on conductor 10 can pass through gate 27 into conductor 34 for passage to the next stage because of a D.C. voltage from either conductor 30 from flip-flop 2 or conductor 33 from flip-flop 5 passing through "OR" gate 31. This pulse cannot pass through gate 24 due to the lack of a D.C. voltage from flip-flop 5 through conductor 32, and the pulse cannot pass through gate 26 due to the lack of D.C. voltages from both of conductors *28b* and 32 from flip-flops 2 and 5 respectively. The same result is achieved in the second combination as in the first with the only difference in the reasoning being the pulse passes through gate 27 because of the D.C. voltage from conductor 33 only passing through "OR" gate 31, and, the signal cannot pass through gate 26 only because of a lack of D.C. voltage through conductor 32.

Combination 3 results in the pulse coming in through conductor 10 to pass through gate 27 and proceed to the third stage over conductor 34, the passage through gate 27 by virtue of the D.C. voltage from flip-flop 2 passing through conductor 30 and "OR" gate 31. This pulse cannot pass through gate 26 due to the lack of a D.C. voltage from flip-flop 2 through conductor *28b*, but can pass through "OR" gate 25 and gate 24 because of the D.C. voltage from flip-flop 5 through conductor 32, which in turn causes flip-flop 2 to change its conducting state. The pulse coming in through conductor 10 in combination 4 fails to pass through gate 27 due to a lack of a D.C. voltage from either of flip-flops 2 or 5 through conductors 30 or 33. However, the pulse can pass through gate 26 by virtue of D.C. voltages from both of the flip-flops 2 and 5 through conductors *28b* and 32 respectively, permitting the pulse to pass to the third stage over conductor 35, thereby indicating a "carry" to the third stage. Likewise, the pulse can pass through gate 24 due to the D.C. voltage passed from flip-flop 5 to gate 24 through conductor 32, this passage of the pulse to flip-flop 2 causing a change in the conducting state of flip-flop 2.

With the pulse coming in through conductor 9, this indicates a "carry" into the stage from the preceding stage or stages and under binary principles constitutes carry of a binary 1. Under combination 5, the pulse through conductor 9 and branch *9c* can pass through gate 23 due to a D.C. voltage from both flip-flops 2 and 5 entering gate 23 through conductors 30 and 33, with the passed pulse from gate 23 passing on to the third stage via conductor 34. Simultaneously, the pulse passes to "OR" gate 21 via conductor branch *9a*, and is passed through gate 20 due to the presence of a D.C. voltage thereto from flip-flop 5 via conductor 33, this passage of the pulse serving to change the conducting state of flip-flop 2. Because of the lack of a D.C. voltage passing through "OR" gate 29 from either of flip-flops 2 or 5 via conductors *28a* or 32, the pulse cannot get through gate 22 to enter the next stage through conductor 35.

With combination 6, the pulse from conductor 9 can get through gate 20 in view of a D.C. voltage from flip-flop 5 through conductor 33 and hence will change the conducting state of flip-flop 2. Meanwhile it cannot get through gate 23 due to a lack of D.C. voltage from flip-flop 2 through conductor 30, and can get through 22 because of the presence of a D.C. voltage thereto from flip-flop 2 through conductor *28a* and "OR" gate 29. Similarly in combination 7, the pulse cannot get through gates 20 or 23 because of a lack of D.C. voltages from flip-flop 5 via conductor 33; while the pulse can pass through gate 22 to conductor 35 by virtue of a D.C. voltage entering gate 22 from flip-flop 5 through conductor 32 and "OR" gate 29.

In the last combination, number 8, the pulse from conductor 9 cannot pass through gate 20 due to the lack of a D.C. voltage from flip-flop 5 through conductor 33. Likewise, the pulse cannot pass through gate 23 due to a lack of D.C. voltages from both flip-flops 2 and 5 through conductors 30 and 33 respectively. However, the pulse can pass through gate 22 and conductor 35 to the next stage due to a D.C. voltage from either of flip-flops 2 or 5 passing to gates 29 and 22 through conductors *28a* and 32 respectively.

The third and any subsequent stage are identical in circuitry to the second stage, and therefore a detailed explanation of the third stage is not made, it being the similarity will be readily apparent to one skilled in the art when it is pointed out that flip-flops 3 and 6 and conductors 34 and 35 bear the same relationship to the third stage as flip-flops 2 and 5 and conductors 10 and 9 bear to the second stage respectively.

Thus, it can be seen that in any stage the passage of the pulse therethrough is over only one of a maze of paths, the proper path being controlled by the presence of certain predetermined required signals or voltages that are automatically present when the register conditions are such that the pulse is to go through that path, all other paths for the pulse being blocked by the lack of some one or more signals or voltages. While an add pulse can only enter the first stage through a single conductor, such add pulse can enter each of the subsequent stages over either one of two conductors. It is also to be noted that an add pulse can leave any of the stages over one of two conductors. In all cases other than for the introduction of the add pulse to the first stage, whichever path the pulse passes through is the proper one, and the one controlled by the conducting states of the flip-flops at the time the pulse passes through. It is further now apparent that there is no delay of the pulse passage to await any change in the conducting state of any flip-flop, the only time concerning the change of state of a flip-flop being as considered heretofore in Formula 2 wherein it was indicated such time was to be considered for timing purposes when a repetitious add signal could be introduced in a multiplication computation of a series of repetitious additions.

From the foregoing rules of binary addition combined with the shown, described and operative examples of the circuitry, an addition logic table can be compiled from which the operation of any one stage can be predicated. This addition table is as follows:

| | | | | | | | | |
|---|---|---|---|---|---|---|---|---|
| Condition of flip-flop in A Register | 0 | 0 | 1 | 1 | 0 | 0 | 1 | 1 |
| Condition of flip-flop in B Register | 0 | 1 | 0 | 1 | 0 | 1 | 0 | 1 |
| "Carry" from the previous stage | Yes | Yes | Yes | Yes | No | No | No | No |
| Change A Register flip-flop | Yes | No | Yes | No | No | Yes | No | Yes |
| "Carry" to succeeding stage | No | Yes | Yes | Yes | No | No | No | Yes |

So far only the circuitry utilized in binary addition and multiplication has been discussed. By combining certain additional components with those already discussed, binary subtraction and division can also be included so as to handle all functions of addition, subtraction, multiplication and division in binary computations. As previously stated, the circuitry portions shown in dotted lines are those required to be combined with the solid line adder components to provide subtractor capabilities, or vice versa, are those components required for the subtractor without the adder capabilities.

Referring back to the drawing, the first stage subtraction circuitry also contains flip-flop 1 in the A register and flip-flop 4 in the B register. When a subtract pulse is supplied to the subtractor by introduction to conductor 36 at point or terminal 37 by any appropriate means (not shown), the pulse will cause subtraction of the binary number in B register flip-flop 4 from A register flip-flop 1, and this subtract pulse, which may also be considered a command signal, passes on to the second stage over one of the conductors 38 or 39. The pulse passage from the first to the second stage through conductor 38 supplies a combined subtract pusle wth a "no borrow" from the succeeding or second stage, while a pulse passage through conductor 39 carries a subtract pulse with a "borrow" from the succeeding or second stage; the determination of whether the subtract pulse passes through conductor 38 or 39 being controlled by the gating and the condition of flip-flops 1 and 4. The subtract pulse entering through conductor 36 passes to "OR" gate 11, triple coincidence gate 40, and double coincidence gate 41 simultaneously over conductor branches **36*a*, 36*b* and 36*c* respectively. A D.C. voltage is supplied to gate 40 from the right hand side of flip-flop 1 when that tube (or supply) indicates a high voltage through a conductor 42 leading off conductor 16, and another D.C. voltage is supplied to gate 40 from the left hand tube of flip-flop 4 when that tube indicates a high voltage through a conductor 43 leading off conductor 19. Likewise, a D.C. voltage is supplied to an "OR" gate 44 from either or both the left hand tube of flip-flop 1 and the right hand tube of flip-flop 4 when either or both those tubes indicate a high voltage, the voltage from the left hand tube of flip-flop 1 passing through conductor 45 leading from conductor 18, and the voltage from the right hand tube of flip-flop 4 passing through conductor 46 leading from conductor 17. A D.C. voltage passing through conductors 45 and/or 46 continues through "OR" gate 44 to gate 41**.

For an example of following a subtract pulse through the first subtractor stage to see how the various gates in combination with the D.C. voltages control the path of the pulse, reference is first made to the general rules of binary subtraction set forth heretofore. By eliminating consideration of "borrows" as there is no previous stage, the pulse passage to the second stage over conductor 38 can only occur when there is either a binary 0 in flip-flop 4 or a binary 1 in flip-flop 1, and likewise can only pass to the second stage over conductor 39 when there is a binary 0 in flip-flop 1 and a binary 1 in flip-flop 4. Again, the combination of flip-flops 1 and 4 can be any one of the following four:

| Combination | Flip-flop 1 | Flip-flop 4 |
|---|---|---|
| 1 | 1 | 1 |
| 2 | 1 | 0 |
| 3 | 0 | 0 |
| 4 | 0 | 1 |

In the case of combination 1, a subtract pulse through conductor branches **36*a*, 36*b* and 36*c* simultaneously can pass through gate 41 and conductor 38 to the second stage due to the presence of a D.C. voltage from flip-flop 1 over conductor 45 and "OR" gate 44. The pulse cannot pass through gate 40 due to the lack of a D.C. voltage from flip-flop 1 over conductor 42, while the pulse can pass through gate 14 into flip-flop 1 due to the D.C. voltage from flip-flop 4 through conductor 19, thereby changing the conducting state of flip-flop 1. The result is the same in combination 2 except that there is no change in the conducting state of flip-flop 1 as the pulse in conductor 36*a* cannot pass through gate 14 due to the lack of a D.C. voltage from flip-flop 4 to gate 14 through conductor 19. Also, there is a D.C. voltage provided to "0$" gate 44 and gate 41 from both flip-flops 1 and 4 through conductors 45 and 46 respectively, and there is no D.C. voltage at all to gate 40 due to the lack of D.C. voltages in both of conductors 42 and 43**.

Combination 3 will likewise pass the subtract pulse or signal through gate 41 due to the D.C. voltage from flip-flop 4 through conductors 17 and 46, the pulse or signal failing to be passed through gate 40 by the lack of a D.C. voltage through conductors 19 and 43, this lack of D.C. voltage through conductor 19 also preventing the pulse through **36*a* passing gate 14, and hence no change in the conducting state of flip-flop 1**.

In combination 4, a subtract pulse cannot pass gate 41 due to the lack of D.C. voltages over either of the conductors pairs 17–46 or 18–45. On the other hand the pulse will pass through gate 14 by the presence of a D.C. voltage through conductor 19, as well as the pulse will pass through gate 40 in view of the D.C. voltages supplied thereto through conductors 42 and 43; and so in this case the subtract pulse passes to the second stage in a manner to indicate to the second stage that to complete the computation the first stage had to make a binary "borrow" from the second stage.

Thus, it can be seen the subtractor command pulse introduced at terminal 37 passes through the circuits from the first stage to the second stage through one of two conductors the same as was the case in addition, conductor 38 carrying the subtract pulse with the indication of a "no borrow" made from the second stage, and conductor 39 carrying the subtract pulse with the indication of a binary "borrow" from the second stage by the first stage.

The second stage subtractor circuitry is provided with a gating maze similar to that of the adder circuitry, the second stage circuitry being also slightly different from the first stage subtractor circuitry by the addition of one triple coincidence gate and two double coincidence gates, each of the double coincidence gates having an additional "OR" gate.

In the second stage, a subtract pulse entering through conductor 38, which indicates a "no borrow," passes to duoble coincidence gate 47 through conductor branch 38*a*, triple coincidence gate 48 through conductor branches 38*b* and 38*c* and double coincidence gate 24 through conductor branch 38*b* after passage through "OR" gate 25. A subtract pulse entering through conductor 39, which indicates a "borrow," passes to triple coincidence gate 49 through conductor branch 39*a*, double coincidence gate 50 through conductor 39, and double coincidence gate 20 through conductor branch 39*b* after passage through "OR" gate 21. The D.C. voltage from the binary 1 side of flip-flop 2 passes to gates 47 and 49 through conductor 28*a*, the passage to gate 47 after passage through "OR" gate 51; while the D.C. voltage from the binary 0 side of flip-flop 2 passes to gates 48 and 50, the passage to gate 50 after passage through "OR" gate 52. The D.C. voltage from the binary 1 side of flip-flop 5 passes to gates 48 and 50 through conductor 32, the passage to gate 50 after passage through "OR" gate 52, and the D.C. voltage from the binary 0 side of flip-flop 5 passing to gates 47 and 49 over conductor 33, the passage to gate 47 after passage through "OR" gate 51.

With the second stage subtractor circuitry as shown and described, it is believed a better understanding of this portion of the invention can be achieved by considering each of the possible combinations of the conducting states of flip-flops 2 and 5 the same way as they were considered for the second stage adder circuitry. Accordingly, the eight combinations are:

| Combination | Flip-flop 2 | Flip-flop 5 | Pulse Conductor |
|---|---|---|---|
| 1 | 1 | 1 | 38 |
| 2 | 1 | 0 | 38 |
| 3 | 0 | 0 | 38 |
| 4 | 0 | 1 | 38 |
| 5 | 1 | 1 | 39 |
| 6 | 1 | 0 | 39 |
| 7 | 0 | 0 | 39 |
| 8 | 0 | 1 | 39 |

In the first combination the pulse entering on conductor 38 can pass through gate 47 into conductor 53 for passage to the next stage because of a D.C. voltage through "OR" gate 51 into gate 47 from flip-flop 2 over conductor 28*a*. This pulse will also pass through conductor 38*b* and gate 24 into flip-flop 2 to change the conducting state thereof, the pulse passage through gate 24 occurring by passage of a D.C. voltage from flip-flop 5 to gate 24 through conductor 32. The pulse cannot pass through gate 48 because of the lack of a D.C. voltage from flip-flop 2 over conductor 30. The net result is the same in the second combination, but is achieved by the fact the subtract pulse passes through gate 47 by virtue of the D.C. voltage from either flip-flop 2 over conductor 28*a* or from flip-flop 5 over conductor 33, both of which D.C. voltages go into gate 47 through "OR" gate 51. The pulse cannot go through gate 48 due to a lack of D.C. voltages from both flip-flop 2 over conductor 30 and flip-flop 5 over conductor 32, as well as the pulse cannot pass through gate 24 due to the lack of D.C. voltage from flip-flop 5 through conductor 32.

Combination 3 results in the pulse coming in through conductor 38 to pass through gate 47 and proceed to the third stage over conductor 53, the passage through gate 47 by virtue of the D.C. voltage from flip-flop 5 passing through conductor 33 and "OR" gate 51. This pulse cannot pass through either of gates 48 and 24 because of the lack of a D.C. voltage to either or both gates from flip-flop 5 over conductor 32. The pulse coming in through conductor 38 in combination 4 fails to pass through gate 47 due to a lack of D.C. voltage from either of flip-flops 2 or 5 through conductors 28*a* and 33 respectively. However, the pulse can pass through gate 48 by virtue of D.C. voltages from both of flip-flops 2 and 5 through conductors 30 and 32 respectively, permitting the pulse to pass to the third stage through conductor 54. Likewise, the pulse can pass through gate 24 due to the D.C. voltage passed from flip-flop 5 to gate 24 through conductor 32, this passage of the pulse to flip-flop 2 causing a change in the conducting state of flip-flop 2.

With the pulse coming in through conductor 39, this indicates a "borrow" by the preceding stage or stages and under binary principles constitutes a subtraction of a binary 1. Under combination 5, the pulse through conductor 39 cannot pass through gates 49 or 20 due to the lack of a D.C. voltage from flip-flop 5 over conductor 33, while it can pass through gate 50 and to the third stage through conductor 54 by virtue of a D.C. voltage from flip-flop 5 over conductor 32 and through "OR" gate 52.

With combination 6, the pulse can get through gate 20 due to the D.C. voltage from flip-flop 5 over conductor 33, and hence change the conducting state of flip-flop 2. While this pulse cannot pass through gate 50 due to the lack of a D.C. voltage from either flip-flop 2 or 5 through conductors 30 or 32 respectively, the signal can pass to the third stage over conductor 53 due to passing through gate 49 by virtue of D.C. voltages from both flip-flops 2 and 5 over conductors 28*a* and 33 respectively. The seventh combination likewise permits passage of the pulse through gate 20 due to a D.C. voltage from flip-flop 5 through conductor 33 whereby the conducting state of flip-flop 2 is changed. This pulse cannot pass through gate 49 due to the lack of a D.C. voltage from flip-flop 2 through conductor 28*a*, but the pulse can pass through gate 50 by virtue of the D.C. voltage from flip-flop 2 through conductor 30 and "OR" gate 52, the pulse passing on to the third stage through conductor 54.

In the eighth and last combination, the pulse coming in through conductor 39 cannot pass through gate 49 due to a lack of D.C. voltages from both flip-flops 2 and 5 through conductors 28*a* and 33 respectively, nor can it pass through gate 20 also due to the lack of D.C. voltage from flip-flop 5 through conductor 33. This pulse can pass through gate 50 due to either of the D.C. voltages from flip-flops 2 and 5 through conductors 30 and 32 respectively, the pulse subsequently passing to the third stage through conductor 54.

As in the adder circuitry, the third stage of subtractor circuitry is similar to the second stage and therefore a detailed explanation of the third subtractor stage is not made. Thus, it can also be seen that the subtractor circuitry functions similar to the adder circuitry in that in any subtractor stage the passage of the pulse therethrough is over only one of a maze of paths, the proper path being controlled by a combination of gates. Also, the above discussion relative to the adder circuitry as concerns delays, and number of conductors into and out of stages is applicable likewise to the subtractor circuitry.

From the foregoing rules of binary substraction combined with the shown, described and operative examples of the circuitry, a subtraction logic table can be compiled from which the operation of any one stage can be predicated. This substraction table is as follows:

| | | | | | | | | |
|---|---|---|---|---|---|---|---|---|
| Condition of flip-flop in A Register | 0 | 0 | 1 | 1 | 0 | 0 | 1 | 1 |
| Condition of flip-flop in B Register | 0 | 1 | 0 | 1 | 0 | 1 | 0 | 1 |
| "Borrow" by the previous stage | Yes | Yes | Yes | Yes | No | No | No | No |
| Change A Register flip-flop | Yes | No | Yes | No | No | Yes | No | Yes |
| "Borrow" from a succeeding stage | Yes | Yes | No | Yes | No | Yes | No | No |

From the foregoing it can be seen how this invention provides a high speed binary adder and subtractor wherein command signals of pulse logic are utilized by transmission to a plurality of stages almost simultaneously as in true parallel circuitry except for the relatively short gating passage times and the fact the pulses are not fed consistently to each stage over the same circuitry paths as in true parallel circuitry. Likewise, there is some similarity to the carrying of the command pulse logic serially through each successive stage, but with the only time delay of that of the relatively fast gating without consideration of the delay from the relatively slow flip-flops.

Furthermore, flexibility of operation is provided, for regardless of the number of stages being used compared to the number of computer stages available, the time delay is constant between pulses in a repetitive type computation, whether add or subtract pulse logic is used, as is indicated by Formula 2.

While a particular embodiment of the invention has been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. A binary digital computer circuit comprising a first and a second register each having a plurality of bi-stable means, each bi-stable means representing and indicating one stage of a binary number, each stage of bi-stable means in both said first and second registers interconnected together by a circuitry means, a plurality of pulse lines interconnecting the circuitry means of each stage of bi-stable means with adjacent stages, and at least one pulse line leading into the first stage circuitry means whereupon passage of a command pulse into the first stage circuitry means over said line will pass through each stage, the passage from one stage to a subsequent one through only one of the interconnecting pulse lines with said command pulse passage through each binary stage changing the binary number in the first register by the amount of the binary number in the second register while concurrently changing the binary status of the first register bi-stable means in each appropriate stage determined by the interconnecting pulse line carrying the command pulse into the stage and the binary status of the second register bi-stable means in that stage, the interconnecting pulse line the command pulse passes through determined by the binary status of the pair of bi-stable means in each stage and the interconnecting pulse line that carried the pulse into the stage.

2. A binary digital computer circuit comprising a first and a second register each having a plurality of flip-flop devices, each flip-flop device in each register representing one stage of a binary number and indicative of the presence or lack of the binary digit it represents, an electrical circuit logic means interconnecting both flip-flops of each stage together as well as with the next previous and next subsequent stages, said electrical circuit logic means including a plurality of gating means, and a portion of said electrical circuit logic means of pulse carrying ability to provide a plurality of pulse paths in each stage as well as carry any pulse introduced into the first stage over only one of a plurality of pulse paths between each pair of adjacent stages with said command pulse passage through each binary stage changing the binary number in the first register by the amount of the binary number in the second register while concurrently changing the binary status of the first register flip-flop device in each appropriate stage determined by the interconnecting pulse line carrying the command pulse into the stage and the binary status of the second register flip-flop device in that stage, the pulse path from each stage to the next subsequent stage determined and controlled by the indicating state of the first and second register flip-flops in the stage and the path the pulse was introduced into that stage.

3. A binary digital computer circuit comprising a first and second register each having a plurality of flip-flop devices, each flip-flop device in each register representing one stage of a binary number and indicative of the presence or lack of the binary digit it represents, a pulse carrying electrical circuit logic means providing a command pulse path into the first stage and a plurality of command pulse paths between each pair of adjacent stages, a plurality of gating means in said pulse circuit means in each stage at least some of which are responsive to which path the command pulse enters the stage through, and each gating means connected to at least one flip-flop device in its stage, said connections between the flip-flops and gating means indicating the presence or lack of the binary digit in the flip-flop of both said first and second registers in that stage to control which path the command pulse passes through to the next subsequent stage, said command pulse passage through each binary stage changing the binary number in the first register by the amount of the binary number in the second register while concurrently changing the binary status in each appropriate stage of the first register flip-flop devices determined by the interconnecting pulse line carrying the command pulse into the stage and the binary status of the second registed flip-flop device in that stage, said command pulse path to be the next subsequent stage dependent upon which path the command pulse entered the stage and the status of the flip-flops in both said first and second registers in that stage.

4. A binary digital computer adder circuit comprising a first and a second register each having a plurality of flip-flop devices, each flip-flop device in each register representing one stage of a binary number and indicative of the presence or lack of the binary digit it represents, an electrical circuit logic means interconnecting the same stage of flip-flop device in both said first and said second registers, a plurality of gating means within said electrical circuit logic means of each stage, each gating means connected to at least one flip-flop device of that stage, each pair of adjacent electrical circuit logic means stages interconnected by a pair of pulse carrying conductors, and a single pulse carrying conductor leading into the first stage for introducing an add command pulse to add the binary number in the first register to the binary number in the second register and indicate the total in the second register, the gating means in each stage arranged to provide passage of the add command pulse over one of the pair of pulse carrying conductors leading to the next stage and which of the two conductors being determined by the conductor upon which the add command pulse entered the stage and the status of the flip-flops in that stage of the first and second registers, and gating means between the pulse path through that stage and the second register flip-flop device in that stage whereby said pulse may be passed during its passage through the electrical circuit logic means of that stage to said second register flip-flop device in that stage to change the indicating status thereof if it is to be changed by the binary addition computation, said pulse passage serially through each stage effecting the increase of the binary number in said second register by the amount of binary number in said first register concurrently with changing the indicating status in each appropriate stage of the second register flip-flop devices.

5. A binary digital computer adder circuit comprising a first and a second register each having a plurality of flip-flop devices, each flip-flop device in each register representing one stage of a binary number and indicative of the presence or lack of the binary digit it represents, an electrical circuit logic means interconnecting the same stage of flip-flop device in both said first and said second registers, a plurality of gating means within said electrical circuit logic means of each stage, each gating means connected to at least one flip-flop device of that stage, each pair of adjacent electrical circuit logic means stages interconnected by a pair of pulse carrying conductors, a single pulse carrying conductor leading into the first stage for introducing an add command pulse to add the binary number in the first register to the binary number in the second register and indicate the total in the second register, the gating means in each stage arranged to provide passage of the add command pulse over one of the pair of pulse carrying conductors leading to the next stage and which of the two conductors being determined by the conductor upon which the add command pulse entered the stage and the status of the flip-flops in that stage of the first and second registers, and gating means between the add command pulse path through that stage and the second register flip-flop device in that stage whereby said add command pulse may be passed to said second register flip-flop device in that stage to change the indicating status thereof if it is to be changed by the binary addition computation, the time delay of said gating means being substantially less than the time delay involved in changing the indicating status of said second register flip-flop whereby said add command pulse passes on to subsequent stages prior to completion of any required change in the indicating status of said second register flip-flop said pulse passage serially through each stage effecting the increase of the binary number in said second register by the amount of binary number in said first register concurrently with changing the indicating status in each appropriate stage of the second register flip-flop devices.

6. A binary digital computer adder circuit comprising a first and a second register each having a plurality of flip-flop devices, each flip-flop device in each register representing one stage of a binary number and indicative of the presence or lack of the binary digit it represents, a pulse carrying electrical circuit logic means interposed between the pair of flip-flops of the first and second registers for that stage, a single pulse conductor leading into the first stage electrical circuit logic means for introduction of a command pulse to add the binary number in the first register to the binary number in the second register and indicate the total in the second register, a pair of pulse conductors interconnecting each pair of adjacent stage electrical circuit logic means, at least three coincidence gates in each stage of electrical circuit logic means for each pulse conductor leading into the stage electrical circuit logic means, one of said coincidence gates connected to each of the pulse conductors connecting that electrical circuit logic means stage with the next subsequent stage, the third coincidence gate connected to the second register flip-flop device in that stage to change the indicating status thereof if it is to be changed by the binary addition computation, and each coincidence gate connected to at least one flip-flop device of that stage, said electrical circuit logic means and gating arranged whereby the add command pulse is passed to the next stage to indicate a combined add signal plus a binary carry to the next stage when passed over one of the pair of pulse conductors and the add command pulse when passed over the second pulse conductor to indicate a combined add signal and no binary carry, which of the pair of pulse conductors utilized controlled by the electrical circuit logic means of that stage and determined by the pulse conductor upon which the add command pulse entered the stage and the status of the flip-flops in that stage of the first and second registers said pulse passage serially through each stage effecting the increase of the binary number in said second register by the amount of binary number in said first register concurrently with changing the indicating status in each appropriate stage of the second register flip-flop devices.

7. A binary digital computer adder circuit comprising a first and a second register each having a plurality of flip-flop devices, each flip-flop device in each register representing one stage of a binary number and indicative of the presence or lack of the binary digit it represents, a pulse carrying electrical circuit logic means interposed between the pair of flip-flops of the first and second registers for that stage, a single pulse conductor leading into the first stage electrical circuit logic means for introduction of a command pulse to add the binary number in the first register to the binary number in the second register and indicate the total in the second register, a pair of pulse conductors interconnecting each pair of adjacent stage electrical circuit logic means, the first of which provides a combined add command signal plus a binary carry to the next subsequent stage and the second of which provides a combined add command signal with no binary carry to the next subsequent stage, at least three coincidence gates in each electrical circuit logic means stage for each pulse conductor leading into the electrical circuit logic means stage, the first of said coincidence gates in each set connected to said first pulse conductor connecting that stage circuit means with the next subsequent stage circuit means and the second of said coincidence gates in each set connected to said second pulse conductor connecting that stage circuit means with the next subsequent stage circuit means, the third coincidence gate connected to the second register flip-flop device in that stage to change the indicating status thereof if it is to be changed by the binary addition computation, and each coincidence gate connected to at least one flip-flop device of that stage, said electrical circuit logic means and gating arranged whereby when the add command pulse is introduced into a stage on said first type pulse conductor indicating a binary carry into the stage said first coincidence gate for that stage is responsive to the indication of a binary 1 in either or both the flip-flop devices in that stage of the first and second registers to deliver the pulse to the next subsequent stage circuit means through the next said first conductor while said second coincidence gate is responsive to the indication of a binary 0 in both the flip-flop devices in that stage of the first and second registers to deliver the pulse to the next subsequent stage circuit means through the next said second conductor, and when the add command pulse is introduced into a stage on said second type pulse conductor indicating a lack of a binary carry into the stage said first coincidence gate is responsive to only both the flip-flop devices in that stage of the first and second registers having a binary 1 to deliver the pulse to the next subsequent stage circuit means through the next said first conductor while said second coincidence gate is responsive to the indication of a binary 0 in either or both the flip-flop devices in that stage of the first and second registers to deliver the pulse to the next subsequent stage circuit means through the next said second conductor.

8. A binary digital computer subtractor circuit comprising a first and a second register each having a plurality of flip-flop devices, each flip-flop device in each register representing one stage of a binary number and indicative of the presence or lack of the binary digit it represents, an electrical circuit logic means interconnecting the same stage of flip-flop device in both said first and said second registers, a plurality of gating means within said electrical circuit logic means of each stage, each gating means connected to at least one flip-flop device of that stage, each pair of adjacent electrical circuit logic means stages interconnected by a pair of pulse carrying conductors, and a single pulse carrying conductor leading into the first stage for introducing a subtract command pulse to subtract the binary number in the first register from the binary number in the second register and indicate the remainder in the second register, the gating means in each stage arranged to provide passage of the subtract command pulse over one of the pair of pulse carrying conductors leasing to the next stage and which of the two conductors being determined by the conductor upon which the subtract command pulse entered the stage and the status of the flip-flops in that stage of the first and second registers, and gating means between the subtract command pulse path through that stage and the second register flip-flop device in that stage whereby said pulse may be passed during its passage through the electrical circuit logic means of that stage to said second register flip-flop device in that stage to change the indicating status thereof if it is to be changed by the binary subtraction computation, said pulse passage serially through each stage effecting the decrease of the binary number in said second register by the amount of binary number in said first register concurrently with changing the indicating status in each appropriate stage of the second register flip-flop device.

9. A binary digital computer subtractor circuit comprising a first and a second register each having a plurality of flip-flop devices, each flip-flop device in each register representing one stage of a binary number and indicative of the presence or lack of the binary digit it represents, a pulse carrying electrical circuit logic means interposed between the pair of flip-flops of the first and second registers for that stage, a single pulse conductor leading into the first stage electrical circuit logic means for introduction of a command pulse to subtract the binary number in the first register from the binary number in the second register and indicate the remainder in the second register, a pair of pulse conductors interconnecting each pair of adjacent stage circuit means, at least three coincidence gates in each stage circuit means for each pulse conductor leading into the stage circuit means, one of said coincidence gates connected to each of the pulse conductors connecting that stage circuit means with the next subsequent stage circuit means, the third coincidence gate connected to the second register flip-flop device in that stage to change the indicating status thereof if it is to be changed by the binary subtraction computation, and each coincidence gate connected to at least one flip-flop device of that stage, said circuit means and gating arranged whereby the subtract command pulse is passed to the next stage to indicate a combined subtract signal plus a binary borrow to the next stage when passed over one of the pair of pulse conductors and the subtract command pulse when passed over the second pulse conductor to indicate a combined subtract signal and no binary borrow carry, which of the pair of pulse conductors utilized controlled by the stage circuit means and determined by the pulse conductor upon which the subtract command pulse entered the stage and the status of the flip-flops in that stage of the first and second registers said pulse passage serially through each stage effecting the decrease of the binary number in said second register by the amount of binary number in said first register concurrently with changing the indicating status in each appropriate stage of the second reigster flip-flop device.

10. A binary digital computer subtractor circuit comprising a first and a second register each having a plurality of flip-flop devices, each flip-flop device in each register representing one stage of a binary number and indicative of the presence or lack of the binary digit it represents, a pulse carrying electrical circuit logic means interposed between the pair of flip-flops of the first and second registers for that stage, a single pulse conductor leading into the first stage electrical circuit logic means for introduction of a command pulse to subtract the binary number in the first register from the binary number in the second register and indicate the remainder in the second register, a pair of pulse conductors interconnecting each pair of adjacent stage circuit means, the first of which provides a combined subtract signal plus a binary borrow from the next subsequent stage and the second of which provides a combined subtract signal with no binary borrow from the next subsequent stage, at least three coincidence gates in each stage circuit means for each pulse conductor leading into the stage circuit means, the first of said coincidence gates in each set connected to said first pulse conductor connecting that stage circuit means with the next subsequent stage circuit means and the second of said coincidence gates in each set connected to said second pulse conductor connecting that stage circuit means with the next subsequent stage circuit means, the third coincidence gate connected to the second register flip-flop device in that stage to change the indicating status thereof if it is to be changed by the binary subtraction computation, and each coincidence gate connected to at least one flip-flop device of that stage, said circuit means and gating arranged whereby when the subtract command pulse is introduced into a stage on said first type pulse conductor indicating a binary borrow from the previous stage said first coincidence gate for that stage is responsive to the indications of a binary 1 and a binary 0 respectively of said first and second register flip-flop devices in that stage to deliver the subtract command pulse to the next subsequent stage circuit means through the next said first conductor while said second coincidence gate is responsive to the indication of a binary 0 and a binary 1 respectively of said first and second register flip-flop devices in that stage to deliver the subtract command pulse to the next subsequent stage circuit means through the next said second pulse conductor, and when the subtract command pulse is introduced into a stage on said second type pulse conductor indicating a lack of a binary borrow from the previous stage said first coincidence gate is responsive to a binary 0 or a binary 1 respectively of said first and second register flip-flop devices in that stage to deliver the subtract command pulse to the next subsequent stage circuit means through the next said second pulse conductor while said second coincidence gate is responsive to a binary 1 and a binary 0 respectively of said first and second register flip-flop devices in that stage to deliver the subtract command pulse to the next subsequent stage circuit means through the next said first pulse conductor.

11. A binary digital computer adder and subtractor circuit comprising a first and a second register each having a plurality of flip-flop devices, each flip-flop device in each register representing one stage of a binary number and indicative of the presence or lack of the binary digit it represents, a first and a second pulse carrying electrical circuit logic means interposed between the pair of flip-flops of the first and second registers for each stage, a first pulse conductor leading into the first stage of said first electrical circuit logic means for introduction of a command pulse to add the binary number in the first register to the binary number in the second register and indicate the total in the second register, a second pulse conductor leading into the first stage of said second electrical circuit logic means for introduction of a command pulse to subtract the binary number in the first register from the binary number in the second register and indicate the remainder in the second register, a first pair and a second pair of pulse conductors interconnecting each pair of adjacent stages of said first and second electrical circuit logic means, at least three coincidence gates in each stage of the first and second electrical circuit logic means for each pulse conductor of the first and second pairs leading into the stage circuit means, one of said coincidence gates connected to each of the pulse conductors connecting that stage circuit means with the next subsequent stage circuit means, the third coincidence gate connected to the second register flip-flop device in that stage to change the indicating status thereof if it is to be changed by either a binary addition or subtraction computation, and each coincidence gate connected to at least one flip-flop device of that stage, said first circuit means and gating arranged whereby the add command pulse is passed to the next stage to indicate a combined add signal plus a binary carry to the next stage when passed over one of the first pair of pulse conductors and the add command pulse when passed over the other of said first pair of pulse conductors to indicate a combined add signal and no binary carry, said second circuit means and gating arranged whereby the subtract command pulse is passed to the next stage to indicate a combined subtract signal plus a binary borrow when passed over one of the second pair of pulse conductors and the subtract command pulse when passed over the other of said second pair of pulse conductors to indicate a combined subtract signal and no binary borrow, which of the pair of pulse conductors utilized in both the addition as well as subtraction computations controlled by the stage circuit means and determined by the pulse conductor upon which the command pulse entered the stage and the status of the flip-flops in that stage of the first and second registers.

12. A binary digital computer adder and subtractor circuit comprising a first and a second register each having a plurality of flip-flop devices, each flip-flop device in each register representing one stage of a binary number and indicative of the presence or lack of the binary digit it represents, a first and a second pulse carrying electrical circuit logic means interposed between the pair of flip-flops of the first and second register for each stage, a first pulse conductor leading into the first stage of said first electrical circuit logic means for introduction of a command pulse to add the binary number in the first register to the binary number in the second register and indicate the total in the second register, a second pulse conductor leading into the first stage of said second electrical circuit logic means for introduction of a command pulse to subtract the binary number in the first register from the binary number in the second register and indicate the remainder in the second register, a first pair and a second pair of pulse conductors interconnecting each pair of adjacent stages of said first and second circuit means, the first of the first pair providing a combined add signal plus a binary carry to the next subsequent stage and the second of the first pair providing a combined add signal with no binary carry to the next subsequent stage, the first of the second pair providing a combined subtract signal plus a binary borrow from the next subsequent stage and the second of the second pair providing a combined subtract signal with no binary borrow from the next subsequent stage, at least three coincidence gates in said first and second stage circuit means for each pulse conductor of both the first and second pairs leading into the stage circuit means, the first of said coincidence gates in each set connected to said first pulse conductor connecting that stage circuit means with the next subsequent stage circuit means and the second of said coincidence gates in each set connected to said second pulse conductor connecting that stage circuit means with the next subsequent stage circuit means, the third coincidence gate connected to the second register flip-flop device in that stage to change the indicating status thereof if it is to be changed by either a binary addition or subtraction computation, and each coincidence gate connected to at least one flip-flop device of that stage, said first circuit means and gating arranged whereby when the add command pulse is introduced into a stage on said first type pulse conductor of the first pair indicating a binary carry into the stage said first coincidence gate for that stage is responsive to the indication of a binary 1 in either or both the flip-flop devices in that stage of the first and second registers to deliver the add command pulse to the next subsequent stage first circuit means through the next said first conductor of said first pair while said second coincidence gate is responsive to the indication of a binary 0 in both the flip-flop devices in that stage of the first and second registers to deliver the add command pulse to the next subsequent stage first circuit means through the next said second conductor of said first pair, and when the add command pulse is introduced into a stage on said first pair second type pulse conductor indicating a lack of a binary carry into the stage said first coincidence gate is responsive to only both the flip-flop devices in that stage of the first and second registers having a binary 1 to deliver the add command pulse to the next subsequent stage first circuit means through the next said first conductor of said first pair while said second coincidence gate is responsive to the indication a binary 0 in either or both the flip-flop devices in that stage of the first and second registers to deliver the add command pulse to the next subsequent stage first circuit means through the next said first pair second conductor, while when a subtract command pulse is introduced into a stage on said first type pulse conductor of said second pair indicating a binary borrow from the previous stage said first coincidence gate for that stage is responsive to the indications of a binary 1 and a binary 0 respectively of said first and second register flip-flop devices in that stage to deliver the subtract command pulse to the next subsequent stage second circuit means through the next said second pair first conductor while said second coincidence gate is responsive to the indication of a binary 0 and a binary 1 respectively of said first and second register flip-flop devices in that stage to deliver the subtract command pulse to the next subsequent stage second circuit means through the next said second pair second pulse conductor, and when the subtract command pulse is introduced into a stage on said second pair second type pulse conductor indicating a lack of a binary borrow from the previous stage said first coincidence gate is responsive to a binary 0 or a binary 1 respectively of said first and second register flip-flop devices in that stage to deliver the subtract command pulse to the next subsequent stage second circuit means through the next said second pair second pulse conductor while said second coincidence gate is responsive to a binary 1 and a binary 0 respectively of said first and second register flip-flop devices in that stage to deliver the subtract command pulse to the next subsequent stage second circuit means through the next said second pair first pulse conductor.

References Cited in the file of this patent

R. K. Richards: Arithmetic Operations in Digital Computers, D. Van Nostrand Company, Inc., published February 1955 (pages 81 to 135 relied on).

UNITED STATES PATENT OFFICE
CERTIFICATE OF CORRECTION

Patent No. 3,170,063 February 16, 1965

Joseph A. Webb, Sr.

It is hereby certified that error appears in the above numbered patent requiring correction and that the said Letters Patent should read as corrected below.

Column 1, line 15, for "subtrace" read -- subtract --; column 14, line 28, strike out "be"; column 15, line 25, after "flip-flop" insert a comma; line 66, after "registers" insert a comma; column 16, line 72, for "leasing" read -- leading --; column 17, line 49, after "registers" insert a comma; column 18, line 16, for "and" read -- or --; line 28, for "first" read -- second --; line 33, for "second", second occurrence, read -- first --; column 20, line 23, after "indication" insert -- of --; line 32, for "and", first occurrence, read -- or --.

Signed and sealed this 28th day of December 1965.

(SEAL)
Attest:

ERNEST W. SWIDER
Attesting Officer

EDWARD J. BRENNER
Commissioner of Patents